United States Patent [19]

Utzinger

[11] 4,247,852
[45] Jan. 27, 1981

[54] MONITORING SYSTEM FOR INDICATORS UTILIZING INDIVIDUALLY ENERGIZABLE SEGMENTS

[75] Inventor: Diethelm Utzinger, Zurich, Switzerland

[73] Assignee: Mettler Instrumente AG, Greifensee-Zurich, Switzerland

[21] Appl. No.: 37,704

[22] Filed: May 10, 1979

[30] Foreign Application Priority Data

Jul. 18, 1978 [CH] Switzerland .................... 7754/78

[51] Int. Cl.³ ........................................ G08B 5/22
[52] U.S. Cl. ............................ 340/715; 315/129; 340/765; 340/641
[58] Field of Search ................ 340/715, 641, 642; 315/129, 130

[56] References Cited

U.S. PATENT DOCUMENTS

| | | | |
|---|---|---|---|
| 3,051,955 | 8/1962 | Pfleger et al. | 340/715 X |
| 3,548,403 | 12/1970 | Johnson | 340/715 |
| 3,753,226 | 8/1973 | Schnurmann et al. | 340/715 X |
| 3,866,171 | 2/1975 | Loshbough | 340/715 |
| 3,943,500 | 3/1976 | Buchanan | 340/756 X |
| 4,064,485 | 12/1977 | Leyde | 340/147 R |

*Primary Examiner*—David L. Trafton
*Attorney, Agent, or Firm*—Marianne Rich

[57] ABSTRACT

One electrode each of at least selected ones of the segments of a seven segment liquid crystal indicator is connected to a test lead as well as an energizing lead. The voltage level of the energizing lead is compared to that of the test lead and an error signal is furnished if there is no correspondence therebetween. Where the seven segment indicator has a plurality of digits energized by a multiplexer, the electrodes of corresponding ones of the segments in each digit can be connected together and only one test lead is then provided for the so-formed set of segments.

10 Claims, 5 Drawing Figures

MONITORING SYSTEM FOR INDICATORS UTILIZING INDIVIDUALLY ENERGIZABLE SEGMENTS

The present invention relates to displays which utilize a plurality of individually energizable segments to form a digit or other symbol. In particular, it relates to methods and systems for monitoring the operation of such displays. It is particularly suitable for use with liquid crystal displays in, for example, electrical scales.

BACKGROUND AND PRIOR ART

Monitoring of segment type indicators is particularly important, since failure of a particular segment may result in a false indication which may not be recognizable as such. In the case of light-emitting diodes, the solution to this problem has been to monitor the current flowing through the segments. For liquid crystals such a method is not practical, since the currents to be monitored are very small.

SUMMARY OF THE INVENTION

It is an object of the present invention to disclose a method and system for monitoring liquid crystal indicators or other indicator devices for which the known method and system have some practical disadvantages. Particular consideration is taken of the fact that the place where the energizing lines are connected to the electrodes of the segments (the latter often having been applied in a thin film technique onto a substrate) constitute particularly critical positions.

In accordance with the present invention, monitoring means are provided for an indicator device having a plurality of segments for displaying at least one symbol, such as a digit. The indicator device has energizing means for selectively energizing the segments, said energizing means including a plurality of energizing leads each connected to one of said segments. The monitoring means comprises a plurality of test leads each connected to one of at least a selected number of said segments.

In a preferred embodiment, the energizing lead is connected to one end of an electrode of a segment, while the test lead is connected to the opposite end. However, the test leads and the energizing leads can be connected to each electrode in any desired fashion, for example next to each other, or at right angles to each other. The preferred embodiment has the advantage that the whole electrode is being monitored.

For seven segment indicators which are used to display digits only, as is the case for scales, it is sufficient to monitor only those five segments which will yield an incorrect indication not recognizable as such if inoperative.

When the indicator is driven by a multiplexer, corresponding segments of each symbol may be connected together to form a set. Each set requires only one energizing lead and one test lead. Preferably, the test lead from the last or from the first symbol in the indicator is connected to the monitoring means. This embodiment results in a great saving of leads.

In a further preferred embodiment, the monitoring means comprises a comparator which furnishes an error signal when the voltage levels on the test lead and the energizing lead of a particular electrode are not the same. A microcomputer is furnished which blanks the display in response to an error signal.

In the method according the invention, the voltage level at the test lead is compared to that on the energizing lead and an error signal is furnished upon lack of correspondence therebetween. If a common electrode for all segments is provided, the error signal can then prevent the application of voltage to the common electrode.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENTS

Figures 1, 2:
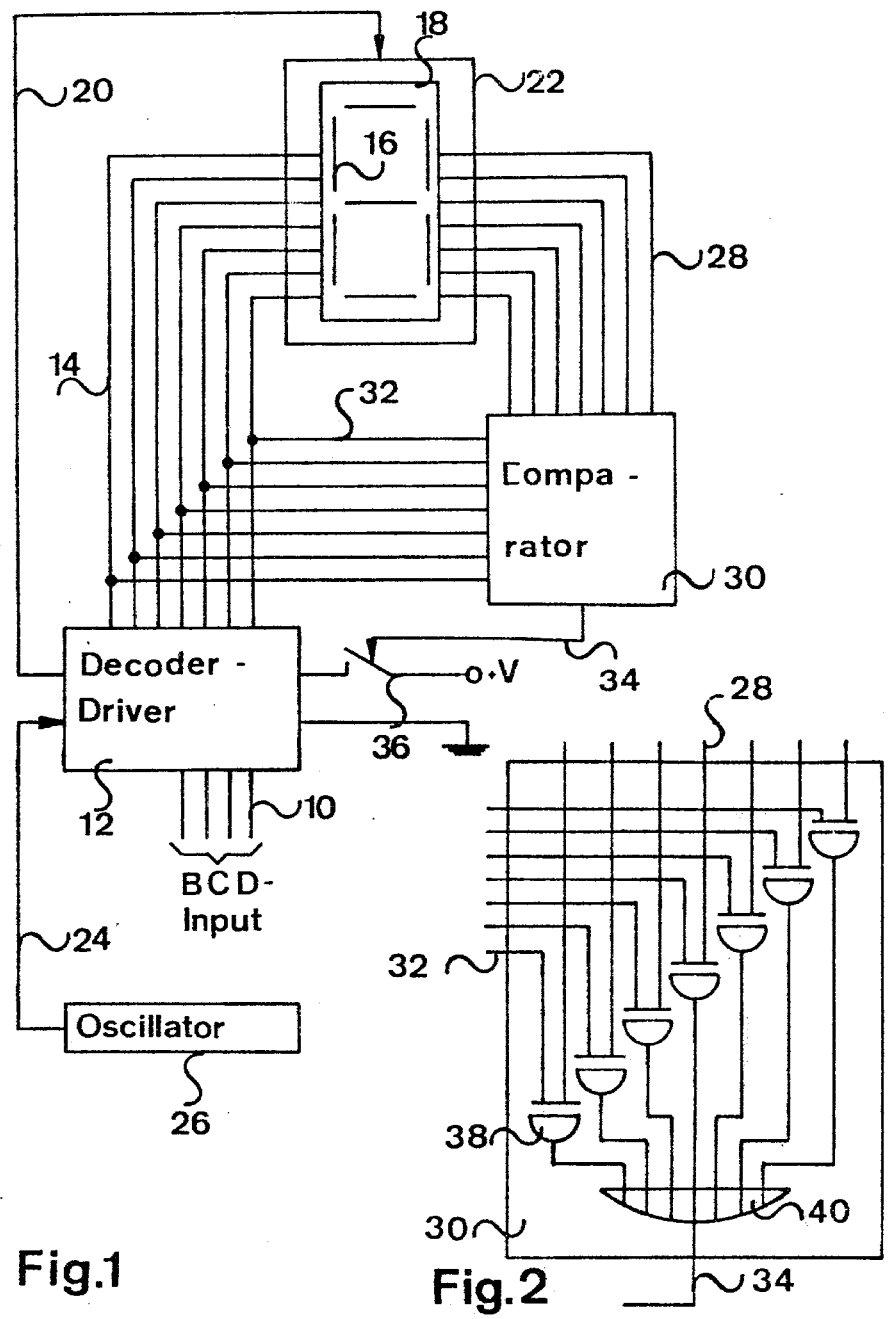
FIG. 1 is a schematic diagram of a single symbol indicator with a monitoring arrangement.
FIG. 2 is a more detailed diagram of the comparator of FIG. 1.

FIG. 1 is a schematic diagram of the present invention as connected to the segments forming a single symbol in an indicator wherein all symbols are energized simultaneously.

The signal signifying the symbol, here a digit, to be displayed is represented by binary coded decimal signals furnished on line 10. The furnishing of these signals is conventional and is not part of the present invention. Decoder-driver 12 has seven output lines 14 each constituting an energizing lead for one of a multiplicity of segments 16 together constituting the display of a digit 18. Lines 14 and thereby the selected ones of segments 16 are energized in accordance with the signals applied to the decoder-driver 12 on lines 10. A line 20 connects decoder-driver 12 to the common electrode 22 for all segments 16. Line 20 is energized in synchronism with the selected ones of lines 14. Synchronization takes place under control of signals applied to decoder-driver 12 on a line 24 energized by an oscillator 26. The energization of the segments in a conventional AC energization wherein selected ones of segments 16 receive AC energization in phase opposition to the energization of common electrode 22 while the segments which are to remain blank are energized with the same phase as the common electrode.

The monitoring means of the present invention include a comparator 30. A test lead 28 connects each segment 16 to one of a first set of inputs of comparator 30. A line 32 connects each energizing lead 14 to one of a second set of inputs of comparator 30. In comparator 30, the voltage level on each of the test lines 28 and the corresponding one of lines 32 is compared and an error signal is furnished if these two voltage levels are not the same. As long as no error signal is furnished, the indicator device operates in a conventional manner. As soon as an error signal is furnished by comparator 30 on a line 34, an electronic switch 36 is activated to disconnect decoder-driver 12 from the supply voltage. The display is therefore blanked out.

FIG. 2 shows a preferred embodiment of comparator 30. It includes seven exclusive OR gates 38 each connected to one of segments 16 by leads 28 and 32. The outputs of the seven gates 38 are connected to the inputs of an OR gate 40 whose output is connected through line 34 to switch 36.

Figure 3:
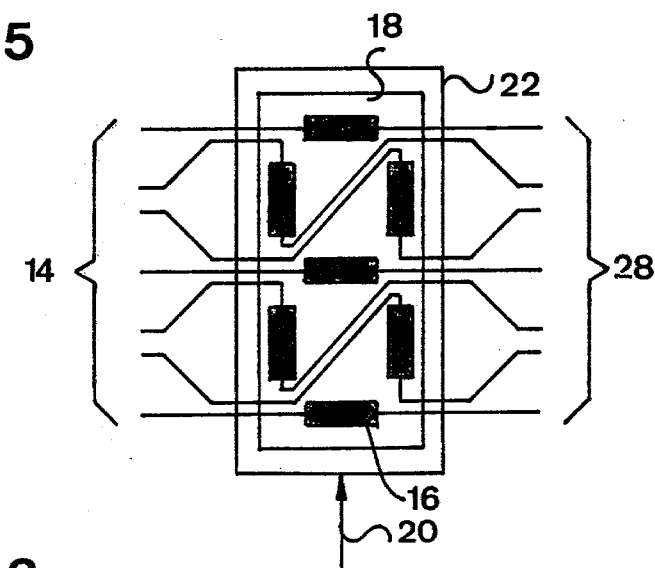
FIG. 3 is a more detailed diagram showing the connections of the energizing and test leads to the electrodes of the segments.

FIG. 3 shows one indicator unit 18. The electrodes for each segment 16 are indicated by 16'. Each electrode 16' has one side connected to an energizing lead 14 and the opposite side connected to a test lead 28.

The above-described system can be improved with respect to reliability by adding a second decoder-driver 12. The same data applied on lines 10 would be applied to the second decoder-driver as inputs to comparator 30 instead of lines 32. In this arrangement, the operation of decoder-driver 12 is tested simultaneously with the connections to segments 16.

Figure 4:
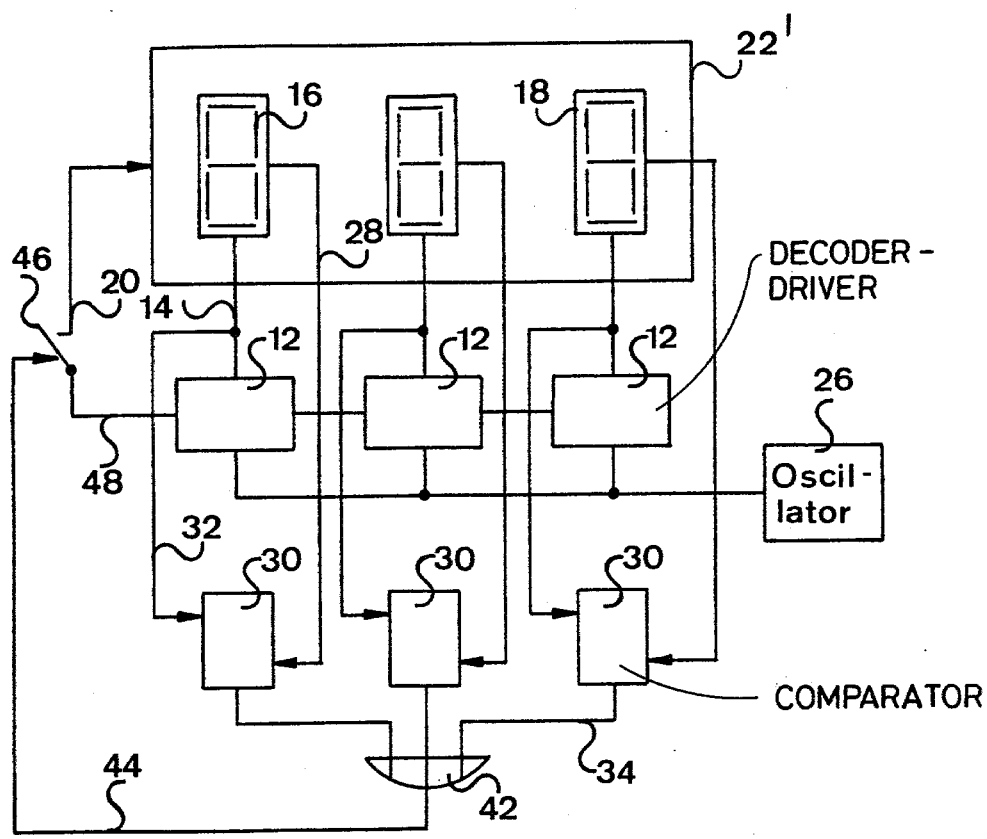
FIG. 4 is a schematic diagram showing a three-place indicator with monitoring means.

A second embodiment, for which the comparator of FIG. 2 and the connections shown in FIG. 3 can also be used is shown in FIG. 4. FIG. 4 illustrates a three-symbol display in which all segments are connected to a single common electrode 22'. The basic construction is the same as that shown in FIG. 1 and corresponding elements have the same reference numerals. It is of course understood that lines 14, 28 and 32 each represent seven lines.

The basic operation is the same as that discussed in connection with FIG. 1. However, the error indication is somewhat different here. The outputs of the individual comparators 30 are connected through a line 34 to a further OR gate 42. The output of OR gate 42 is connected through a line 44 to an electronic switch 46. Switch 46 is connected in line 20 which connects decoder-driver 12 to the common electrode 22'.

The system operates as follows:

As long as the signal on line 44 is a "0" signal (no error detected by comparator 30), the AC voltage is applied through line 20 to common electrode 22' and the display operates in the normal fashion. If, however, the signal on line 44 is a "1" signal, that is if comparator 30 generates an output signal, the display is blanked by opening of switch 46.

It would of course also be possible although more expensive, to interrupt the energization of each decoder-driver 12 upon receipt of the error signal. Further, in a preferred embodiment, the decoder-drivers 12 are constructed in accordance with a CMOS technique.

Figure 5:
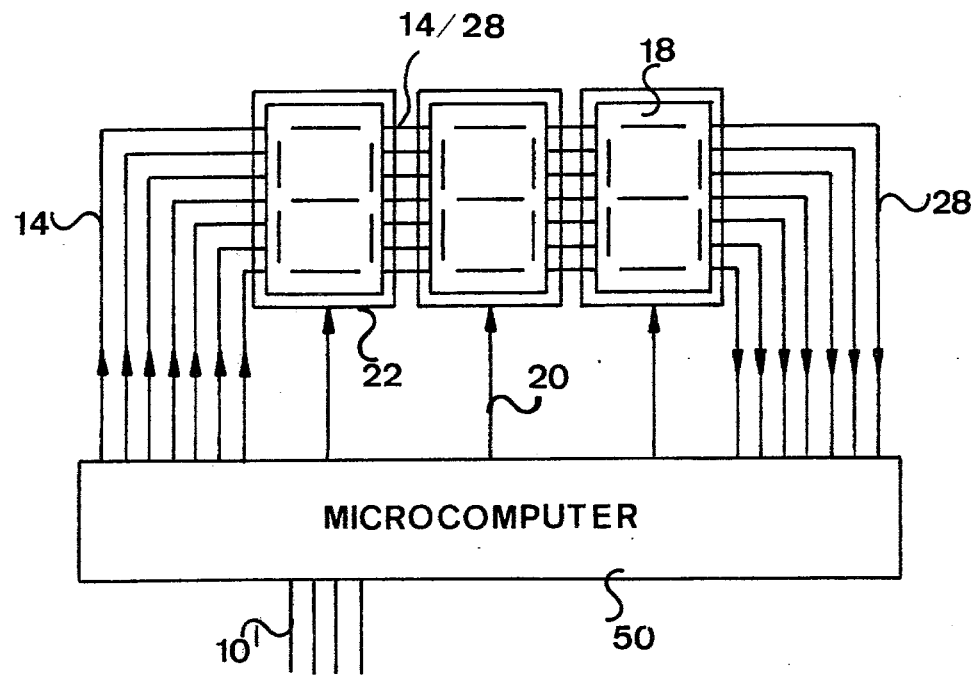
FIG. 5 is a circuit diagram showing a variation of the indicator shown in FIG. 4.

In a third embodiment, illustrated in FIGS. 3 and 5, the amount of required equipment is further reduced. While in the equipment described above the display is driven statically, that is all symbols are energized simultaneously, in the present embodiment a multiplex operation is assumed. In this type of multiplex operation, the electrodes of all segments occupying the same position in the different symbols are connected together and energized simultaneously, while the common electrodes, one for each symbol, are energized sequentially.

Digital data, for example the result of a weighing operation is applied through lines 10' to a microcomputer 50. In response to the signals applied on lines 10', microcomputer 50 energizes the energization leads 14, each of which energizes all segments occupying the same position in each of the symbols. It further energizes the common electrodes 22 through lines 20. Test leads 28 connect the opposite end of each segment set formed by segments in the same position in each symbol to microcomputer 50. Microcomputer 50 contains a comparator which compares the voltage level on each test lead 28 to the voltage level on the corresponding lead 14 and, if the comparison checks out, applies a voltage to common electrode 22 which is opposite in phase to the voltage on line 14. If an error signal is generated, that is if the voltage levels on the two lines are not the same, then the common electrode 22 is energized with the same phase until the same set is again tested, so that the display remains dark. Another possibility to indicate error would be to cause the whole display to flicker by changing the timing of the energization. It is also possible to cause the indicator to be controlled to "888" so that the set of segments having the error is immediately visible.

It should be noted that in this embodiment the lead connecting the segments of one symbol or indicator unit to the corresponding segment in the next symbol or indicator unit actually constitute both the energizing lead 14 and the test lead 28.

It is of course understood that the present invention is not to be limited to three-symbol indicators as illustrated in the drawing. The invention can equally well be applied to fewer or more symbols.

While the invention has been illustrated in preferred embodiments, it is not to be limited to the circuits and structures shown, since many variations thereof will be evident to one skilled in the art and are intended to be encompassed in the present invention as set forth in the following claims. Though in the preferred embodiments the blanking of the display in case of error signals was described, it is evident that various other techniques of indicating the error to the operator could be used, such as providing an error lamp adjacent the display or generating an acoustic signal or causing the display to flicker (blink) in case of error.

I claim:

1. In an indicator device having a plurality of selectively energizable segments, and means for selectively energizing said plurality of segments, said means including a plurality of energizing leads each connected to one of said segments: means for monitoring the operation of said indicator device, said monitoring means comprising
   a plurality of test leads connected to at least selected ones of said plurality of segments; and
   comparator means connected to said energizing leads and said test leads for comparing signals on said energizing lead and said test lead of each of said selected ones of said segments and furnishing an error signal in the absence of correspondence therebetween.

2. An indicator device as set forth in claim 1, wherein said monitoring means further comprises means for blanking said display upon receipt of said error signal.

3. An indicator device as set forth in claim 1, comprising a plurality of substantially identical indicator units, each of said indicator units comprising a multiplicity of said segments arranged in a predetermined pattern;
   further comprising means for connecting corresponding segments in each of said indicator units to each other thereby forming segment sets;
   wherein said energizing means comprises multiplexer means for energizing said indicator units sequentially in a predetermined order; and
   wherein said plurality of test leads comprises only one test lead for each of said segment sets.

4. An indicator device as set forth in claim 3, wherein said only one test lead is a test lead connected to the last of said indicator units.

5. An indicator device as set forth in claim 1, wherein said segments comprise liquid crystals.

6. In an indicator device having a plurality of selectively energizable segments, each of said segments being a line segment having a beginning and an end, and means for selectively energizing said plurality of segments, said energizing means comprising a plurality of energizing leads, each connected to one of said segments, the improvement comprising means for monitoring the operation of said indicator device, said means comprising a plurality of test leads connected to at least selected ones of said plurality of segments; and wherein each of said energizing leads is connected to said beginning and each of said test leads to said end of each of said selected ones of said segments.

7. An indicator device as set forth in claim 6, wherein said energizing means comprises a plurality of energizing leads each connected to one of said segments; and wherein said monitoring means comprises comparator means for comparing signals on said energizing lead and said test lead of each of said selected ones of said segments and furnishing an error signal in the absence of correspondence therebetween.

8. In an indicator device having a plurality of selectively energizable segments, and means for selectively energizing said plurality of segments, said means including a plurality of energizing leads each connected to one of said segments: means for monitoring the operation of said indicator device, said monitoring means comprising a plurality of test leads connected to a predetermined location in each of selected ones of said plurality of segments; and comparator means connected to said energizing leads and said test leads for comparing signals on said energizing lead and said test lead of each of said selected ones of said segments and furnishing an error signal in the absence of correspondence therebetween.

9. In an indicator device having a plurality of selectively energizable segments each having a beginning and an end, a method for monitoring the operation of said indicator device, comprising the steps of comparing the voltage level at said beginning of at least a selected one of said segments to the voltage level at the end of said selected one of said segments and furnishing an error signal upon lack of correspondence therebetween; and furnishing a visual indication of said error signal.

10. A method as set forth in claim 9, wherein said visual indication is a deenergization of said segments.

* * * * *